United States Patent Office 3,011,998
Patented Dec. 5, 1961

3,011,998
CONDENSATION OF ALDEHYDES WITH TRIAZINYL PHOSPHONIC ESTERS AND AMIDES AND PRODUCTS THEREOF
Gaetano F. D'Alelio, South Bend, Ind., assignor, by direct and mesne assignments, to Dal Mon Research Co., Cleveland, Ohio, a corporation of Delaware
No Drawing. Filed Oct. 17, 1958, Ser. No. 767,778
19 Claims. (Cl. 260—45.2)

This invention relates to the production of new synthetic materials and more particularly to new products of particular utility in the plastics and coating arts.

The new compositions of this invention comprise condensation products of ingredients comprising an aldehyde, including polymeric aldehydes, hydroxyaldehydes and aldehyde-addition products, e.g., formaldehyde, paraformaldehyde, aldol, glucose, dimethylol urea, trimethylol melamine, etc., and a triazine derivative corresponding to the general formula:

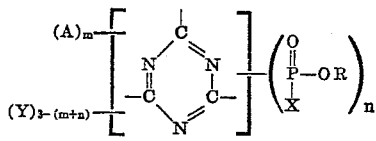

In the above formula $n$ and $m$ are integers of at least one and no more than two and the sum of $m$ and $n$ does not exceed three, A represents an aldehyde-reactable group, Y represents any monovalent radical, X represents —OR or —NR$_2$, and R represents hydrogen, a hydrocarbon radical, or a substituted hydrocarbon radical. In the above formula, it may be seen that when $n$ is one, $m$ can be one with one Y group, or $m$ can be two with no Y group; or if $n$ is two then $m$ is one and there will be no Y group. The only requirement for the triazine derivative of this invention is that it have at least one aldehyde-reactable group A and at least one

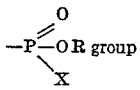

The aldehyde-reactable group is a grouping of atoms or radicals that react with aldehyde or polymeric-aldehydes to form a derivative such as illustrated by the following:

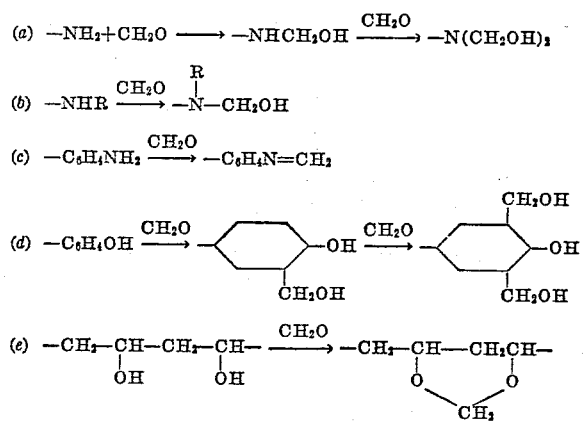

As illustrative examples of the aldehyde-reactable group, A, there are mentioned the following groups:

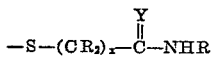

as disclosed in my U.S. Patent 2,295,562, issued September 15, 1942, wherein $x$ is an integer of at least 1 and not more than 2, Y represents a member of the class consisting of oxygen and sulfur, and R represents a member of the class consisting of hydrogen and monovalent hydrocarbon and halohydrocarbon radicals;

as disclosed in my U.S. Patent 2,295,565, issued September 15, 1942, wherein Y represents a member of the class consisting of hydrogen and monovalent hydrocarbon and halohydrocarbon radicals;

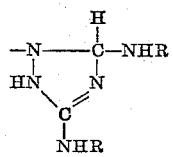

as disclosed in my U.S. Patent 2,295,562, issued September 15, 1942, wherein R represents a member of the class consisting of hydrogen and monovalent hydrocarbon and halohydrocarbon radicals;

as disclosed in my U.S. Patent 2,312,688, issued March 2, 1943, wherein Y represents a member of the class consisting of oxygen and sulfur and R represents a member of the class consisting of hydrogen and hydrocarbon radicals and halohydrocarbon radicals;

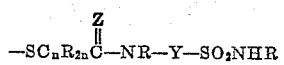

as disclosed in my U.S. Patent 2,312,690, issued March 2, 1943, wherein $n$ represents an integer and is at least one and not more than 2, Z represents a member of the class consisting of oxygen and sulfur, Y represents a bivalent carbocyclic radical, and R represents a member of the class consisting of hydrogen and monovalent hydrocarbon radicals and substituted hydrocarbon radicals;

—NR—Z—SO$_2$NHR as disclosed in my U.S. Patent 2,312,697, issued March 2, 1943, wherein Z represents an aryl nucleus and R represents a member of the class consisting of hydrogen and monovalent hydrocarbon radicals and substituted hydrocarbon radicals;

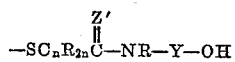

as disclosed in my U.S. Patent 2,312,700, issued March 2, 1943, wherein $n$ represents an integer and is at least one and not more than 2, Z' represents a member of the class consisting of oxygen and sulfur, Y represents a bivalent carbocyclic radical and R represents a member of the class consisting of hydrogen and monovalent hydrocarbon radicals and substituted hydrocarbon radicals;

—NHR as disclosed in my U.S. Patent 2,335,846, issued December 7, 1943, wherein R represents a member of the class consisting of hydrogen and monovalent hydrocarbon radicals and halohydrocarbon radicals;

—Z—CONHR wherein Z represents a divalent hydrocarbon radical and R represents hydrogen and a monovalent hydrocarbon radical and substituted hydrocarbon radicals;

—B—Z—CONHR wherein B represents a member of the class consisting of oxygen, sulfur and

Z represents a divalent hydrocarbon radical and substituted hydrocarbon radicals, and R represents a member of the class of hydrogen and monovalent hydrocarbon radicals and substituted hydrocarbon radicals;

HNR—NR— wherein R represents a member of the class consisting of hydrogen and monovalent hydrocarbon radicals and substituted hydrocarbon radicals;

HO—Z— wherein Z represents a divalent aromatic radical and substituted hydrocarbon radicals as hereinabove defined. A few typical triazine compounds are

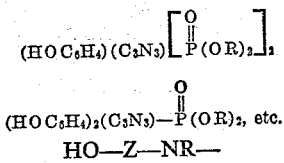

HO—Z—NR— wherein R represents hydrogen and monovalent hydrocarbon radicals and substituted hydrocarbon radicals, and Z represents a divalent aromatic radical and substituted hydrocarbon radicals as hereinabove described. A few typical compounds are

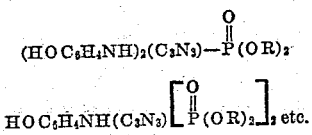

RCONHNR— wherein R represents hydrogen and a monovalent hydrocarbon radical and substituted hydrocarbon radicals as previously defined hereinabove.

R₂NCY—NR—CHR'— as disclosed in my U.S. Patent 2,339,623, issued January 18, 1944, wherein Y represents oxygen or sulfur, at least one R represents hydrogen and the other R's represent hydrogen, a monovalent hydrocarbon radical or a monovalent halogenated hydrocarbon radical, and R' represents hydrogen or a monovalent aliphatic, carbocyclic or aromatic hydrocarbon radical of not more than 6 carbon atoms; etc.

Thus it may be seen that A may be any aldehyde-reactable group.

In the above triazine derivative formula, Y can be R which represents hydrogen or any monovalent hydrocarbon radical, whether saturated or unsaturated, substituted or unsubstituted, aliphatic, carbocyclic, aryl or heterocyclic, mono- or poly-nuclear, etc. Examples of suitable hydrocarbon groups represented by R are aliphatic, aromatic, e.g., methyl, ethyl, propyl, isopropyl, butyl, secondary butyl, butenyl, amyl, hexyl, allyl, methallyl cyclopentenyl, cyclohexyl, cyclohexenyl, phenyl, diphenyl, naphthyl, tolyl, xylyl, ethylphenyl, propylphenyl, isopropylphenyl, allylphenyl, benzyl, phenylallyl, phenylpropyl, etc. and their homologues, as well as those groups with one or more of their hydrogen atoms substituted by halogens, as, for example, fluorine, chlorine, nitro groups, nitroso groups, amino groups, carboxyl groups, carbalkoxy groups, methoxy and aryloxy groups, mercapto groups, etc.; Y can also be hydroxyl and the alkoxy and aryloxy radicals of aliphatic, cycloaliphatic, aromatic and heterocyclic hydroxy compounds, such as methyl alcohol, ethyl alcohol, butyl alcohol, isobutyl alcohol, dodecyl alcohol, phenol, the o-, m-, and p-cresols, the xylenols, the naphthols, ethylene glycol, methyl glycol ether, butyl glycol ether, glycerine, pentaerythritol, naphthol, hydroxy pyridine, including the alkoxy and aryloxy radicals of hydroxy acids and esters such as lactic acid, ethyl lactate, allyl lactate, methyl salicylate, and the chloro derivatives such as chlorophenol, chloronaphthol, ethylene chlorohydrin, and the acetoxy derivatives such as acetoxyethyl alcohol, etc., and these radicals are represented by RO—; Y can also be R—S— groups which are the mercapto equivalents to RO—; Y can also be —NR₂, that is, an amino group, a monosubstituted amino group or a disubstituted amino group, as for example, the radicals of methylamine, ethylamine, butylamine, nonylamine, benzyl amine, dimethyl amine, aniline, naphthylamine, ethanol amine, diethanolamine, diisopropylamine, methylaniline, piperidine, aminopyridine, and the hydrazine radicals, namely, R₂NNR— from hydrazine, unsymmetrical dimethyl hydrazine, symmetrical dimethyl hydrazine, trimethyl hydrazine, phenyl hydrazine; Y can also be the N-radicals of the amino-acids, the amino-esters, the amino-amides, and the amino-nitriles, specific examples of which are

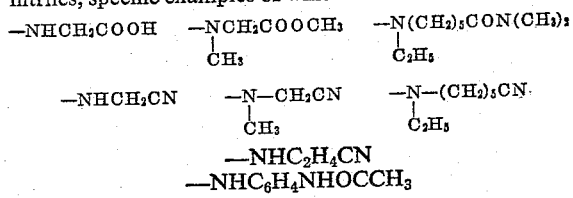

—NHC₂H₄CN
—NHC₆H₄NHOCCH₃

Y can also be radicals of alkylene imines such as for example,

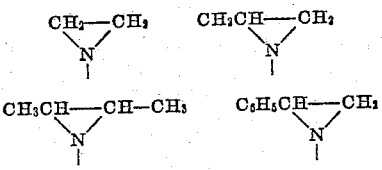

and the radicals of malonic esters and substituted malonic esters, nitriles and amides, such as, for example,

—CH(COOCH₃)₂
—CH(COOCH₂CH=CH₂)₂
—CH(CN)₂
—CH[CON(CH₃)₂]₂

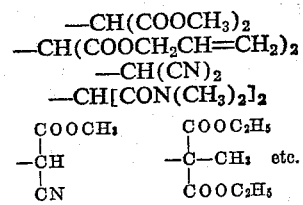

or Y can be the radical of another triazinyl ring, e.g., (CH₃NH)₂(C₃N₃)—, (HO)₂(C₃N₃)—, of the triazine ring can be attached through a bridge, such as

[(CH₃)₂N]₂(C₃N₃)—NHCH₂CH₂NH—
(C₂H₅NH)₂(C₃N₃)—OCH₂CH₂O—
(H₂N)₂(C₃N₃)—NHCH₂CH₂O—, etc.

Y can also be chlorine, bromine, —CN, COOR, etc.; as well as A and

Thus, it may be seen that a wide variety of modified triazines can be used in the practice of this invention.

In practicing this invention the initial condensation reaction can be carried out at normal or elevated temperatures, at atmospheric, subatmospheric, or superatmospheric pressures, and under neutral, alkaline or acid conditions. Preferably, in most cases, the reaction between the components is initiated under alkaline conditions.

Any substance yielding an alkaline or an acid aqueous solution can be used in obtaining alkaline or acid conditions for the initial condensation reaction. For example, an alkaline substance such as sodium, potassium carbonate, mono-, di-, or tri-amines, etc., can be used. In some cases, it is desirable to cause the initial condensation reaction between the components to take place in the presence of a primary condensation catalyst and a secondary condensation catalyst. The primary catalyst can be either an aldehyde-non-reactable nitrogen-containing basic tertiary compound, e.g., tertiary amines such as trialkyl (e.g. trimethyl, triethyl, etc.) amines, or an aldehyde-reactable nitrogen-containing basic compound, for instance, ammonia, primary amines (e.g. ethyl-amine, propyl amine, etc.) and secondary amines (e.g. dipropylamine, dibutylamine, etc.). The secondary condensation catalyst, which ordinarily is used in an amount less than the amount of the primary catalyst, advantageously is a fixed alkali, for instance, a carbonate, cyanide, or hydroxide of an alkali metal (e.g. sodium, potassium, lithium, etc.).

Illustrative examples of acid condensation catalysts that can be employed are inorganic or organic acids, such as hydrochloric, sulfuric, phosphoric, acetic, lactic, acrylic, malonic, etc., or acid salts, such as sodium acid sulfate, monosodium phosphate, monosodium phthalate, etc. Mixtures of acids, of acid salts, or acids and acid salts can be employed, if desired.

The reaction between the aldehyde, e.g., formaldehyde, and the triazine derivative can be carried out in the presence of solvents, diluents, fillers, or other natural or synthetic resinous bodies, or while admixed with other materials that can also react with the aldehydic compound or with the triazine derivatives, e.g., ketones, urea, thiourea, selenourea, iminourea (guanidine), substituted ureas, thioureas, selenoureas, and iminoureas, numerous examples of which are given in my U.S. Patent 2,322,566, issued June 22, 1943; monoamides of monocarboxylic acids and polycarboxylic acids and polyamides of polycarboxylic acid, e.g., acetamide, halogenated acetamides (e.g. chloroacetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aldehyde-reactable diazine compounds, such as are disclosed in my U.S. Patent 2,382,211, issued August 14, 1945; aminotriazines, e.g., melamine, ammeline, ammelide, melem, melam, melon, etc.; phenol and substituted phenols, e.g., the cresols, the xylenols, the tertiary alkylphenols and other phenols, such as mentioned in my U.S. Patent 2,339,441; monohydric and polyhydric alcohols, e.g., butyl propylene glycol, pentaerythritol, polyvinyl alcohol, etc.; amines, including aromatic amines, e.g., aniline, etc. and the like. In such cases, the triazine derivatives should represent 5–95% by weight of the aldehyde reactive portion of such mixture.

The modifying reactants can be incorporated with the triazine derivative and the aldehyde to form an intercondensation product by mixing all the reactants and effecting condensation therebetween or by various permutations of reactants. For instance, a partial condensation product can be formed of ingredients comprising (1) urea or melamine or urea and melamine, (2) a triazine derivative of this invention, (3) an aldehyde, including polymeric aldehydes, hydroxy aldehydes and aldehyde-addition products, for instance, formaldehyde, paraformaldehyde, dimethylol urea, a polymethylol melamine; and thereafter reaction effected between this partial condensation product, and, for example, a curing reactant, specifically a chlorinated acetamide or an amino acid.

Some of the condensation products of this invention are thermoplastic materials even at an advanced stage of condensation, while others are thermosetting or potentially thermosetting bodies that convert under heat or under heat and pressure to an insoluble infusible state. The thermoplastic condensation products are of particular value as plasticizers for other synthetic resins. The thermosetting, or potentially thermosetting resinous condensation products, alone or mixed with fillers, pigments, dyes, lubricants, plasticizers, curing agents, etc., can be used, for example, in the production of molding and laminating compositions. In other cases, they can be used as ion exchange resins and as tanning agents.

The liquid intermediate condensation products of this invention can be concentrated by the removal or, or diluted further by the addition of volatile solvents, to form liquid coating compositions of adjusted viscosity and concentration. The heat-convertible or potentially heat-convertible resinous condensation products can be used in the liquid state, for instance, as impregnants for wood, leather, paper and other porous bodies; as surface-coating materials in the production of paints, varnishes, lacquers, enamels, etc., for general adhesive applications in producing laminated articles, and for other purposes. The liquid, heat-hardenable or potentially heat-hardenable condensation products also can be used directly as casting resins, while those which are of gell-like nature in the partially condensed state can be granulated and dried to form clear, unfilled heat-convertible resinous products.

In producing these new condensation products the choice of the aldehyde is dependent largely on economic considerations and upon the particular properties desired in the finished product. Preferred aldehydic reactants are formaldehyde and compounds engendering formaldehyde, e.g., paraformaldehyde, hexamethylene tetramine, etc. Illustrative examples of other aldehydes that can be employed are acetaldehyde, propionaldehyde, butyraldehyde, heptaldehyde, octaldehyde, acrolein, methacrolein, crotonaldehyde, benzaldehyde, furfural, hydroxyaldehydes (e.g., aldol, glucose, glycollic aldehyde, glyceraldehyde, etc.), mixtures thereof or mixtures of formaldehyde (or compounds engendering formaldehyde) with such aldehydes. Illustrative examples of aldehyde-addition products that can be used instead of the aldehydes themselves are the mono- and poly-(N-carbinol) derivatives, particularly the mono- and polymethylol derivatives of urea, thiourea, selenurea, and iminourea, and substituted ureas, thioureas, selenoureas, and iminoureas, mono- and poly-(N-carbinol) derivatives of amides or polycarboxylic acids, e.g., maleic, itaconic, fumaric, adipic, malonic, succinic, citric, phthalic, etc., mono- and poly-(N-carbinol) derivatives of the aminotriazoles, mono- and poly-(N-carbinol) derivatives of the aminotriazines. Particularly good results are obtained with active methylene-containing bodies as a methylol urea, more particularly mono- and dimethylol ureas, a methylol aminotriazine, more particularly a methylol melamine, e.g., monomethylol melamine and polymethylol melamines di-, tri-, tetra-, penta-, and hexamethylol melamines). Mixtures of aldehydes and aldehyde-addition products can be employed, e.g., mixtures of formaldehyde and methylol compounds, such, for instance, as dimethylol urea, trimethylol melamine, hexamethylol melamine, etc.

The ratio of the aldehydic reactant to the triazine derivative can be varied over a wide range depending upon the particular properties desired in the finished product. Ordinarily these reactants are employed in an amount corresponding to at least one mole of the aldehyde, especially formaldehyde, for each mole of the triazine derivative. Thus, for example, one to seven or eight or more moles of an aldehyde can be used for each mole of the triazine derivative. When an aldehyde is available for reaction in the form of an alkylol derivative, more particularly a methylol derivative such, for instance, as dimethylol urea, trimethylol melamine, etc., then higher amounts of such aldehyde-addition products are used, for instance, from 2 to 3 up to 15 to 20 or more moles of such alkylol derivatives for each mole of the triazine derivative.

As indicated hereinbefore, the properties of the fundamental resin can be varied widely by introducing other modifying bodies before, during, or after effecting condensation between the primary components. Thus, modifying agents that can be used include, for example, methyl, ethyl propyl, isopropyl, isobutyl, hexyl, etc., alcohols; polyhydric alcohols, such as, for example, diethylene glycol, triethylene glycol, pentaerythritol, etc.; alcohol ethers, e.g., ethylene glycol monomethyl ether, ethylene glycol monoethyl ether, diethylene glycol monobutyl ether, etc.; amides, such as formamide, stearamide, acrylamide, benzene sulfonamides, toluene sulfonamide, the aryl disulfonamides, adipic diamide, phthalamide, etc.; amines, e.g., ethylene diamine, phenylene diamine, etc.; ketones, including halogenated ketones, etc.; nitriles, including halogenated nitriles, e.g., acrylonitrile, methacrylonitrile, succinonitrile, fumaryl nitrile, chloroacetonitriles, etc.; acylated ureas, more particularly halogenated acylated ureas of the kind described in my U.S. Patent 2,851,559, and others.

The modifying bodies also can take the form of high molecular weight bodies with or without resinous characteristics, for example, hydrolyzed wood products, formalized cellulose derivatives, lignin, protein-aldehyde condensation products, aminotriazine, aldehyde condensation products, aminotriazole-aldehyde condensation products, polyacrylamide, styrene-maleic imide copolymers, etc. Other examples of modifying bodies are the urea-aldehyde condensation products, the aniline-aldehyde condensation products, furfural condensation products, phenol-aldehyde condensation products, modified or unmodified, saturated or unsaturated polyhydric-alcohol-polycarboxylic acid condensation products, water-soluble cellulose derivatives, natural gums and resins, such as shellac, rosin, etc.; polyvinyl compounds, such as polyvinyl esters, e.g., polyvinyl acetate, polyvinyl butyrate, etc., polyvinyl ethers including polyvinyl acetals, especially polyvinyl formal, etc.

Dyes, pigments, plasticizers, mold lubricants, opacifiers and various reinforcing fillers (e.g. wood flour, glass fibers, including defibrated asbestos, mineral wool, mica, cloth cuttings, glass cloth, glass mat, etc.) can be compounded with the resin in accordance with conventional practice to provide various thermoplastic and thermosetting molding compositions.

The modified and unmodified resinous compositions of this invention have a wide variety of uses. For example, in addition to their use in the production of molding compositions, they can be used as modifiers of other natural and synthetic polymers, as laminating varnishes in the production of laminated articles wherein sheet materials, e.g., paper, cloth, sheet asbestos, glass mats and glass fibers, etc., are coated and impregnated with the resin, superimposed and thereafter united under heat or heat and pressure. They can be used in the production of insulated wire coatings or baking enamels from which insulated wires and other coated products are made; for bonding or cementing together mica flakes to form a laminated mica article, for bonding together, abrasive grains in the production of resin-bonded abrasive articles such, for instance, as grindstones, sand-papers, emery cloths, etc., in the manufacture of electrical resistors, etc. They can also be employed for treating cotton, linen, and other cellulosic materials in sheet or other form. They can also be used as impregnants for electrical coils and for other electrically insulating applications. Because of the phosphorous and nitrogen content of these resins, they can be used as fire-retardant impregnants and coatings alone, or in combination with other materials, such as with cellulosic substances.

The present invention is based on the discovery that new and valuable materials having particular utility in the polymer, plastics, impregnating and coating arts can be produced by effecting reaction between ingredients comprising an aldehyde, including polymeric aldehydes and aldehyde-addition products, and a triazine derivative of the kind embraced by the above general formula. Among the triazine derivatives embraced by the formulas of the various classes of compounds used in producing the new condensation products of this invention are the triazines having the substituents indicated by the groups attached to the structure

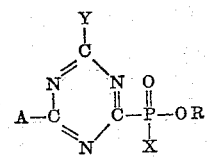

in the following table, wherein substituent G represents the

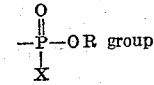 group

| Substituent A | Substituent Y | Substituent G |
|---|---|---|
| —NH₂ | —NH₂ | —P(OCH₃)₂ (with =O) |
| —NH₂ | —NH₂ | —P(OC₂H₅)₂ (with =O) |
| —NH₂ | —P(OC₂H₅)₂ (with =O) | —P(OC₂H₅)₂ (with =O) |
| —NHC₆H₅ | —NH₂ | —P(OC₃H₇)₂ (with =O) |
| —NHCH₃ | —NHCH₃ | —P(OC₃H₇)₂ (with =O) |
| —NH₂ | —Cl | —P(OC₂H₅)₂ (with =O) |
| —NH₂ | —OH | —P(OCH₂CH=CH₂)₂ (with =O) |
| NH₂OCCH₂—S— | NH₂—OCCH₂—S— | —P(=O)(OC₂H₅)(NHC₆H₅) |
| NH₂CONHNH— | NH₂CONHNH— | —P(=O)(OC₂H₅)(N(CH₃)₂) |
| HOC₆H₄S— | HOC₆H₄S— | —P(OC₂H₅)₂ (with =O) |

| Substituent A | Substituent Y | Substituent G |
|---|---|---|
| HOC₆H₄NH— | HOC₆H₄NH— | —P(O)(OC₂H₅)₂ |
| NH₂—CH—N—, N—NH, C, NH₂ (guanazole) | —OC₆H₅ | —P(O)(OC₂H₅)₂ |
| NH₂—CH—N—, N—NH, C, NH₂ | —OC₆H₄CH₂—CH=CH₂ | —P(O)(OC₂H₅)₂ |
| NH₂—CH—N—, N—NH, C, NH₂ | —N(CH₂CH₂) (aziridine) | —P(O)(OC₂H₅)₂ |
| NH₂CONH— | —N(CH₂CH₂)₂O (morpholino) | —P(O)(OC₂H₅)₂ |
| H₂NSO₂C₆H₄NH— | —OCH₂CH₂OC₆H₅ | —P(O)(OC₂H₅)₂ |
| H₂NSO₂C₆H₄NH— | —CH₂CH₂OH | —P(O)(OC₂H₅)₂ |
| H₂NO₂SC₆H₄O— | —CH₂CH₂CN | —P(O)(OC₂H₅)₂ |
| H₂NO₂SC₆H₄S— | —CH₂COOCH₃ | —P(O)(OC₂H₅)₂ |
| HO-C₆H₁₀(OH)-NH— | —CH(COOC₂H₅)₂ | —P(O)(OC₂H₅)₂ |
| CH₃CONHNH— | —S—C₆H₅ | —P(O)(OC₂H₅)₂ |
| NH₂-C=N-C(NHNH—)=N-C(NH₂)=N (melamine-NHNH—) | —N(C₆H₁₁)₂ | —P(O)(OC₂H₅)(NHC₆H₅) |
| NH₂-C=N-C(NHNH—)=N-C(NH₂)=N | —N(CH₃)—C₆H₄NO₂ | —P(O)(OC₂H₅)(NHC₆H₄Cl) |
| NH₂-C=N-C(NHCH₂CH₂NH—)=N-C(NH₂)=N | —C₆H₅ | —P(O)(OC₂H₅)(NHC₆H₄OCH₃) |
| NH₂-C=N-C(NHCH₂CH₂NH—)=N-C(NH₂)=N | —N(CH₂CH=CH₂)₂ | —P(O)(OC₂H₅)₂ |
| NH₂— | —OC₆H₄COOC₂H₅ | —P(O)(OC₂H₅)₂ |

| Substituent A | Substituent Y | Substituent G |
| --- | --- | --- |
| $NH_2-$ | $\begin{matrix} CH_3 \\ | \\ -N-C_{10}H_7Cl \end{matrix}$ | $-\overset{O}{\underset{\|}{P}}(OC_2H_5)_2$ |
| $NH_2-$ | $-OCH_2CH_2O-C\begin{matrix} N(CH_3)_2 \\ \| \\ C \\ \diagup \diagdown \\ N \quad N \\ \| \quad \| \\ C=N \\ \| \\ N(CH_3)_2 \end{matrix}$ | $-\overset{O}{\underset{\|}{P}}(OC_2H_5)_2$ |
| $NH_2-$ | $-OCH_2CH_2O-C\begin{matrix} N(CH_3)_2 \\ \| \\ C \\ \diagup \diagdown \\ N \quad N \\ \| \quad \| \\ C=N \\ \| \\ N(CH_3)_2 \end{matrix}$ | $-\overset{O}{\underset{\|}{P}}(OC_3H_7)_2$ |
| $H_2NO_2SC_6H_4NH-$ | $H_2NO_2SC_6H_4NH-$ | $-\overset{O}{\underset{\|}{P}}(OC_2H_5)_2$ |
| $CH_3NHO_2SC_6H_4NH-$ | $CH_3NHO_2SC_6H_4NH-$ | $-\overset{O}{\underset{\|}{P}}(OC_2H_5)_2$ |
| $H_2NOC(CH_2)_4NH-$ | $H_2NOC(CH_2)_4NH-$ | $-\overset{O}{\underset{\|}{P}}(OC_2H_5)_2$ |
| $NH_2CONHNHOCCH_2-$ | $NH_2CONHNHOCCH_2-$ | $-\overset{O}{\underset{\|}{P}}(OC_2H_5)_2$ |
| $NH_2OCCH_2O-$ | $H_2NO_2SC_6H_4NH-$ | $-\overset{O}{\underset{\|}{P}}(OC_2H_5)_2$ |
| $\begin{matrix} NH_2OC \\ \quad \diagdown \\ \quad \quad CH- \\ \quad \diagup \\ NH_2OC \end{matrix}$ | $\begin{matrix} H_2NOC \\ \quad \diagdown \\ \quad \quad CH- \\ \quad \diagup \\ H_2NOC \end{matrix}$ | $-\overset{O}{\underset{\|}{P}}(OC_2H_5)_2$ |
| $(NH_2O_2S)_2C_6H_3NH-$ | $(H_2NO_2S)_2C_6H_3NH-$ | $-\overset{O}{\underset{\|}{P}}(OC_2H_5)_2$ |
| $H_2NO_2SC_6H_4NH-$ | $-\overset{O}{\underset{\|}{P}}-OC_2H_5 \\ \underset{\|}{OC_2H_5}$ | $-\overset{O}{\underset{\|}{P}}(OC_2H_5)_2$ |
| $H_2NO_2SC_6H_4NH-$ | $-\overset{O}{\underset{\|}{P}}-OC_2H_5 \\ \underset{\|}{NHC_6H_5}$ | $-\overset{O}{\underset{\|}{P}}-OC_2H_5 \\ \underset{\|}{NHC_6H_5}$ |
| $H_2NO_2SC_6H_4NH-$ | $-\overset{O}{\underset{\|}{P}}-(OC_2H_5)_2$ | $-\overset{O}{\underset{\|}{P}}-OC_2H_5 \\ \underset{\|}{NHC_6H_5}$ |

The triazine derivatives used in practicing the present invention are prepared conveniently by condensing the corresponding chloro-triazines with a phosphoric acid ester, etc.

(1)
$$(A)_2(C_3N_3)Cl + P(OR)_3 \longrightarrow RCl + (A)_2(C_3N_3)\overset{O}{\underset{\underset{OR}{\|}}{P}}-OR$$

or (2)
$$\underset{(Y)}{\overset{(A)}{\underset{|}{(C_3N_3)}}}Cl + P(OR)_3 \longrightarrow RCl + \underset{(Y)}{\overset{(A)}{\underset{|}{(C_3N_3)}}}\overset{O}{\underset{\underset{OR}{\|}}{P}}-OR$$

or (3)
$$(A)(C_3N_3)Cl_2 + 2P(OR)_3 \longrightarrow 2RCl + A-(C_3N_3)\left[\overset{O}{\underset{\underset{OR}{\|}}{P}}-OR\right]_2$$

wherein A, R, and Y are as previously defined and ($C_3N_3$) represents the 1,3,5 triazine ring. Some specific examples of the above are:

(1)  $(NH_2)_2(C_3N_3)Cl + P(OC_2H_5)_3 \longrightarrow$ $$C_2H_5Cl + (NH_2)_2(C_3N_3)\left(\overset{O}{\underset{\underset{OC_2H_5}{\|}}{P}}-OC_2H_5\right)$$

(2)  $\underset{(HO)}{\overset{(NH_2)}{\underset{|}{(C_3N_3)}}}Cl + P(OCH_2CH=CH_2)_3 \longrightarrow$ $$CH_2=CHCH_2Cl + \underset{HO}{\overset{H_2N}{\underset{|}{(C_3N_3)}}}\left(\overset{O}{\underset{\underset{OCH_2CH=CH_2}{\|}}{P}}-OCH_2CH=CH_2\right)$$

(3)  $CH_3NH-(C_3N_3)Cl_2 + 2P(OCH_3)_3 \longrightarrow$ $$2CH_3Cl + (CH_3NH)(C_3N_3)\left[\overset{O}{\underset{\underset{OCH_3}{\|}}{P}}-OCH_3\right]_2$$

Alternately, these compounds can be prepared by using a chlorotriazinyl phosphoric ester with a compound containing a reactive hydrogen, represented by MH wherein M represents Y or A groups, as defined above, for example:

(1) 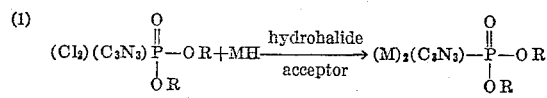

or (2) 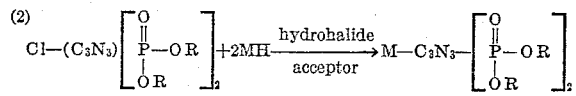

or, as an illustration:

(1a) 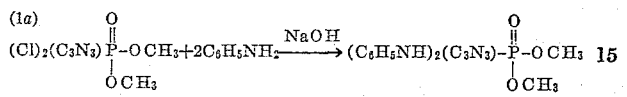

or (2a) 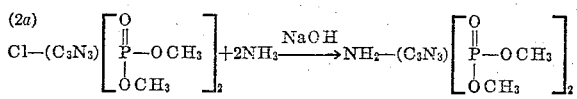

Illustrative of MH compounds are the alcohols such as $CH_3OH$, $C_2H_5—OH$, $(CH_3)_2CHOH$, $C_4H_9OH$, $C_{12}H_{25}OH$, etc.; the cycloaliphatic alcohols such as cyclohexanol, cycloheptanol, cyclopentanol, etc.; ammonia and the amines, e.g., $CH_3NH_2$, $C_2H_5NH_2$, $(CH_3)_2NH$, $CH_2=CH—CH_2NH_2$, $C_6H_5NH_2$, $CH_3C_6H_4NH_2$, $ClC_6H_4NHCH_3$, cyclohexylamine, etc., as well as other reactive-hydrogen-containing compounds having the A and Y groups indicated above.

The triazinyl derivatives of this invention can be converted to the phosphonic acid or salt by hydrolyzing the ester with an alkali or acid, e.g.

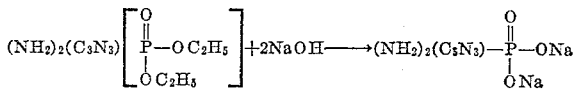

or

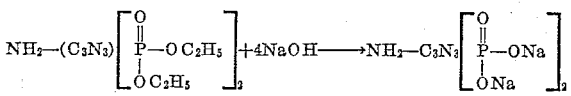

and the free acid can be liberated from the alkali salt by treatment with an inorganic acid or with a cation exchange resin. The triazinyl phosphonic esters of this invention can also be treated with ammonia or amines to produce the phosphonamide, for example,

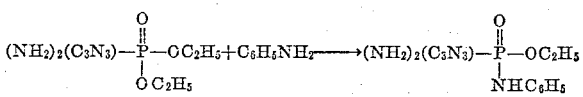

This invention will be more fully described by the following examples. The invention is not to be regarded, however as restricted in any way by these examples and they are to serve merely as illustrations. In these examples, as well as throughout the specification, "parts" and "percentages" shall mean parts by weight and percentages by weight unless specifically provided otherwise.

EXAMPLE I

*Synthesis of monomers*

In a suitable reactor equipped with stirrer and reflux condenser a mixture of 145.5 parts of 2,4-diamino-6-monochloro-1,3,5-triazine and 200 parts of triethyl phosphite and 200 parts of benzene are heated at reflux for eight hours, at which time no more ethyl chloride is released from the reaction. The reaction is then cooled and the solid

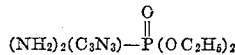

separated by filtration, washed with alcohol and dried, which on analysis gives the following values: 34% carbon, 28.1% nitrogen, 5.35% hydrogen, and 12.2% phosphorus, and a molecular weight of 246.1, which values are in close agreement with the theoretical values. When 165 parts of the corresponding monoamino-dichlorotriazine are reacted instead of the monochlorotriazine with 380 parts of triethyl phosphite, and the reaction product isolated, there is obtained an almost quantitative yield of

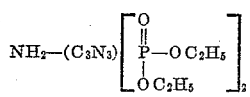

which on analysis gives values of 35.16% carbon, 5.89% hydrogen, 15.35% nitrogen, and 17.21% phosphorus, and a molecular weight of 367.1, which values are in close agreement with the theoretical values. When this diester is allowed to stand at room temperature with aniline, the corresponding

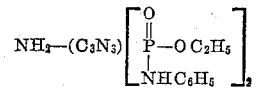

is obtained.

When triallyl phosphite, or other phosphites of the formula $P(OR)_3$ are used instead of the triethyl phosphite, the corresponding triazine derivative is obtained; when halotriazines of the formula $(A)_2(C_3N_3)Cl$, or

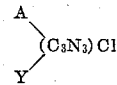

or $A(C_3N_3)Cl_2$ are used instead of the halotriazines of this example, the corresponding triazine derivatives are obtained.

EXAMPLE II

Twenty-one parts of

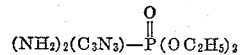

and 32 parts of aqueous formaldehyde (approximately 37% HCHO) are heated together with 0.02 part of sodium hydroxide under reflux at the boiling point of the mixture, for 30 minutes, yielding a resinous reaction product that cures to an insoluble, infusible mass when a sample is heated on a hot plate at 150° C. A satisfactory molding compound that shows adequate flow characteristics during molding is produced by mixing a portion of the resinous syrup with a weight of alpha cellulose equal to the solids content of the syrup followed by drying at low temperature to remove the excess water. A well-cured molded piece is obtained by molding a sample of the dried and ground molding compound for 3 minutes at 145° C. under a pressure of 5000 pounds per square inch. Instead of heating the reactants under reflux, as described above, the mixture is stirred for a longer period, 72 hours, at room temperature to effect reaction between the components and to obtain a soluble, fusible reaction product which is heat hardenable.

Other alkaline condensation catalysts that can be used include sodium carbonate, ammonia, triethanol amine, hexamethylene tetramine, etc., and acidic curing catalysts include acetic acid, phthalic acid, ammonium chloride, ammonium phosphate, glycine, chloroacetamide, chloracetyl urea, etc., or substances which under the influence of the reaction or heat produce such acidic substances.

When instead of

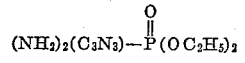

there is used an equivalent amount of

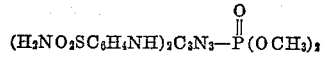

$$(CH_3CONHNH)_2C_3N_3-\overset{O}{\underset{\|}{P}}(OC_2H_5)_2$$

$$(NH_2CONHNH)_2C_3N_3-\overset{O}{\underset{\|}{P}}(OC_2H_5)_2$$

$$(CH_3NH)_2C_3N_3-\overset{O}{\underset{\|}{\underset{NH_2}{P}}}-OC_2H_5$$

$$(HOC_6H_4NH)_2C_3N_3-\overset{O}{\underset{\|}{P}}(OCH_2CH=CH_2)_2$$

etc., heat convertible condensation products are obtained.

EXAMPLE III

| | Parts |
|---|---|
| $(CH_3NH)_2(C_3N_3)-\overset{O}{\underset{\|}{P}}(OC_2H_5)_2$ | 110.0 |
| Aqueous CH₂O (37.5% CH₂O) | 142.5 |
| NaOH (in 5.5 parts H₂O) | 0.12 |

The above ingredients are refluxed for 30 to 45 minutes to produce a resin dispersion which when neutralized with acetic acid and dehydrated produces a clear thermoplastic resin. This resin is acidified with 1 part of phthalic anhydride and heated further to give a hard resin. This resin is also an effective plasticizer for unmodified melamine-formaldehyde or urea-formaldehyde resin. In many cases it is desirable to intercondense this triazine compound directly with the melamine and formaldehyde or with urea and formaldehyde as shown in subsequent examples.

When an equivalent amount of glyoxal is used instead of formaldehyde in this example, thermosetting compositions are obtained.

EXAMPLE IV

| | Parts |
|---|---|
| $(CH_3NH)_2(C_3N_3)-\overset{O}{\underset{\|}{P}}(OC_2H_5)_2$ | 50.0 |
| Urea | 40.0 |
| Aqueous CH₂O (37.5% CH₂O) | 165.0 |
| Aqueous ammonia (approx. 28% NH₃) | 2.5 |
| NaOH (in 5.5 parts water) | 0.12 |

The above ingredients are refluxed for 25 minutes to produce a clear syrup. On dehydration it cures slowly at 140° C. but on the addition at chloro-acetamide, the cure is accelerated. The addition of 80 parts of alpha flock to the syrup produces a molding compound, which, after being dried at 70° C. has an excellent cure and good flow when molded at 135° C. for 4 minutes. The product has a glossy surface and is light-colored. When an equivalent amount of thiourea is substituted in the above formula, the type of cure, molding characteristics, and appearance of the molded product obtained is substantially the same as with that of urea.

EXAMPLE V

| | Parts |
|---|---|
| $(NH_2)_2(C_3N_3)-\overset{O}{\underset{\|}{P}}(OC_2H_5)_2$ | 120.0 |
| Para toluenesulfonamide | 50.8 |
| Aqueous CH₂O (37.5% CH₂O) | 190.0 |
| NaOH (in 5.5 parts NaOH) | 0.12 |

The above ingredients are refluxed for one-half hour to produce a syrup which is clear while hot and cloudy on cooling and has a slow cure. The addition of three parts of phthalic anhydride accelerates the cure.

EXAMPLE VI

| | Parts |
|---|---|
| $(NH_2)_2(C_3N_3)-\overset{O}{\underset{\|}{P}}(OC_2H_5)_2$ | 120.0 |
| Aqueous CH₂O (37.5% CH₂O) | 190.0 |
| Phenol | 29.0 |
| NaOH (in 5 parts H₂O) | 0.1 |

The above ingredients are refluxed for 25-30 minutes to give a clear syrup when hot. At 135° C. the syrup has a prolonged cure but when 2.5 parts of chloroacetamide are added to the composition, an excellent cure is obtained.

EXAMPLE VII

| | Parts |
|---|---|
| $(NH_2)_2(C_3N_3)-\overset{O}{\underset{\|}{P}}(OC_2H_5)_2$ | 100.0 |
| Melamine | 50.0 |
| Aqueous CH₂O (37.5% CH₂O) | 210.0 |

The above mixture is refluxed for 15 minutes. The syrup is clear when hot, when dehydrated cures alone at 135-140° C., and a molding compound containing 100 parts of syrup and 40 parts of alpha flock has excellent flow and cure.

EXAMPLE VIII

| | Parts |
|---|---|
| $(NH_2)_2(C_3N_3)-\overset{O}{\underset{\|}{P}}(OC_4H_9)_2$ | 140.0 |
| Dimethylol urea (containing 15 parts H₂O) | 642.0 |
| NH₃ (in 2.5 parts H₂O) | 0.5 |
| H₂O (distilled) | 1000.0 |
| NaOH (in 10 parts H₂O) | 0.1 |

The above components are mixed and refluxed for 15 minutes. The syrup does not cure well alone at 135° C. but the addition of 3 parts of chloroacetamide accelerates the cure.

EXAMPLE IX

| | Parts |
|---|---|
| $\underset{H_2NO_2SC_6H_4HN}{\overset{H_2N}{\diagdown}}(C_3N_3)-\overset{O}{\underset{\|}{P}}(OC_2H_5)_2$ | 120.0 |
| Aqueous CH₂O (37.5% CH₂O) | 210.0 |
| NH₃ (in 5 parts H₂O) | 1.0 |
| Aqueous trimethylol melamine (50% solution) | 130.0 |

When the above ingredients are refluxed for 20-30 minutes a syrup is obtained which cures slowly alone. The cure is accelerated by ammonium chloride to produce hard resins and molding compounds.

EXAMPLE X

| | Parts |
|---|---|
| $(H_2N)_2(C_3N_3)-\overset{O}{\underset{\|}{\underset{NHC_6H_5}{P}}}-OC_2H_5$ | 120.0 |
| Aqueous CH₂O (37.5% CH₂O) | 142.0 |
| Glycerine | 10.0 |

The above mixture is refluxed for 25-30 minutes to produce a clear resin curing at 135-140° C., which cure is accelerated by the addition of curing agents.

EXAMPLE XI

| | Parts |
|---|---|
| $(NH_2)_2(C_3N_3)-\overset{O}{\underset{\|}{P}}-(OR)_2$ | 120.5 |
| Aqueous CH₂O (37.5% CH₂O) | 142.0 |
| Butyl alcohol | 100.0 |

These ingredients are mixed and refluxed for ½ hour to produce a clear syrup which cures slowly at 135° C. After reflux, the water is removed from the reaction product by azeotroping the mixture and returning the butyl alcohol to the reaction. The butylated resin is reacted with heat-convertible alkyd resins for coatings and enamels of excellent color retention and durability.

EXAMPLE XII

| | Parts |
|---|---|
| $NH_2(C_3N_3)\left[\overset{O}{\underset{\|}{P}}(OC_2H_5)_2\right]_2$ | 40.0 |
| $(NH_2)_2(C_3N_3)-\overset{O}{\underset{\|}{P}}(OC_2H_5)_2$ | 80.0 |
| Aqueous CH₂O (37.5% CH₂O) | 140.0 |
| Diethyl malonate | 20.0 |
| NaOH (in 10 parts H₂O) | 0.15 | are refluxed for 20 minutes to produce a condensation product which cures at 140-160° C.

EXAMPLE XIII

| | Parts |
|---|---|
| $(NH_2)_2(C_3N_3)-\overset{O}{\underset{\|}{P}}(OC_3H_7)_2$ | 120.0 |
| Aqueous CH₂O (37.5% CH₂O) | 140.0 |
| NH₃ (in 5 parts H₂O) | 1.0 |
| Acetamide | 15.0 |

The above mixture is refluxed for 15 minutes to produce a clear syrup which cures alone at 135° C. With phthalic anhydride, chloroacetamide and ammonium chloride, respectively, the cure is excellent.

EXAMPLE XIV

| | Parts |
|---|---|
| $(NH_2)_2(C_3N_3)-\overset{O}{\underset{\|}{P}}(OCH_3)_2$ | 65.0 |
| Acrolein | 30.0 |
| NaOH (in 5 parts $H_2O$) | 0.20 |

The reactants are mixed and refluxed for 15 minutes to produce a syrup which cures at 140° C. to a hard tough resin by the addition of acids or acid producing curing catalysts.

EXAMPLE XV

| | Parts |
|---|---|
| Shellac | 50.0 |
| $(C_2H_5O)_2\overset{O}{\underset{\|}{P}}-(C_3N_3)(NHCH_2OH)_2$ | 15.0 |

The dimethylol derivative is prepared in accordance with the low temperature procedure of Example I. The above components are mixed well and fused at 150° C. At this temperature, the mixture cures to a hard infusible resin. The addition of paraform and hexamethylene tetramine, respectively, hastens the cure. The modified shellac can be used as a binder for mica.

EXAMPLE XVI

| | Parts |
|---|---|
| Alkyd resin (glyceryl phthalate) | 50.0 |
| $(C_2H_5O)_2\overset{O}{\underset{\|}{P}}-(C_3N_3)(NHCH_2OH)_2$ | 15.0 |

These components are mixed together and heated on a hot plate at 150° C., and cures to a hard, infusible product. The curing is accelerated by paraform. The modified alkyl resin is an excellent mica binder.

EXAMPLE XVII

| | Parts |
|---|---|
| $(CH_3NH)_2(C_3N_3)-\overset{O}{\underset{\|}{P}}(OCH_3)_2$ | 60.0 |
| Aqueous formaldehyde (37.1% $CH_2O$) | 80.0 |
| Polyvinyl alcohol (in 60 cc. $H_2O$) | 5.0 |

The mixture is refluxed for 30 minutes to produce a clear syrup which forms a clear thermoplast when heated on a hot plate at 135° C. By lowering the pH of the syrup by the addition of an acid, the syrup is converted to a hard, infusible state. Films baked at 55–60° C. for 15 hours are hard, tough and pliable.

EXAMPLE XVIII

| | Parts |
|---|---|
| $(NH_2)_2(C_3N_3)-\underset{\underset{NHC_6H_5}{\|}}{\overset{O}{\underset{\|}{P}}}-OC_2H_5$ | 120 |
| Furfural | 115.0 |
| NaOH (in 1 part $H_2O$) | 0.05 |

These ingredients are heated together under reflux for 25 minutes to yield a syrup of low viscosity. When dehydrated and heated to 130–140° C., the resin bodies to a viscous thermoplastic resin which is cured by the addition of an acid to produce tough resins.

EXAMPLE XIX

| | Parts |
|---|---|
| Syrupy phenolic resin | 30.0 |
| $(NH_2)_2(C_3N_3)-\overset{O}{\underset{\|}{P}}(OCH_2C_6H_5)_2$ | 4.0 |
| Glycerine | 3.0 |
| Lactic acid | 0.5 |

The phenol-formaldehyde partial condensation is prepared by reacting at 85–90° C. for 2½ hours, 18 parts of phenol, 39 parts of 37.2% formaldehyde solution, and 0.5 part of sodium carbonate, after which the syrup is neutralized to a pH of 7 with lactic acid, and 30 parts of this resin solution is used in the above formulation. The mixed ingredients are first heated together at 50° C., and then heated under a reduced pressure of 50 mm. Hg until an internal temperature of 80° C. is reached. The resulting molasses-like liquid resin is then poured into a container and heated at 70° C. for 72 hours to produce a hard, smooth, homogeneous, insoluble, infusible, light-colored casting.

EXAMPLE XX

| | Parts |
|---|---|
| 1-phenyl guanazole | 35.0 |
| Aqueous formaldehyde (37.2%) | 32.4 |
| Ammonia | 1.2 |
| Aqueous NaOH (0.5 N) | 0.75 |
| Reaction product of Ex. I | 9.0 | are heated together under reflux for 5 minutes at the end of which period separation of a resinous mass occurs. This resin is used satisfactorily for the production of molding compounds.

EXAMPLE XXI

| | Parts |
|---|---|
| Soya bean protein | 20.0 |
| Aqueous ammonia (28% $NH_3$) | 2.5 |
| Aqueous NaOH (0.5 N) | 3.0 |
| Aqueous $CH_2O$ (37.2% $CH_2O$) | 150.0 |
| $(H_2N)_2(C_3N_3)-\overset{O}{\underset{\|}{P}}(OC_2H_5)_2$ | 80.0 | were heated together under reflux at the boiling point of the mixture for 20 minutes. The resulting syrup is mixed with 90 parts of alpha-cellulose and 0.2 part of zinc stearate to form a molding compound which is dried at 70° C. On molding, a well-cured molded piece having a well-knit and homogeneous structure is obtained.

EXAMPLE XXII

| | Parts |
|---|---|
| $(NH_2)_2(C_3N_3)-\overset{O}{\underset{\|}{P}}(OCH_3)_2$ | 100.0 |
| Aldol | 90.0 | are mixed together and then heated for 40 hours at 60° C. The resinous material thereby obtained melts on a hot plate at 140° C. and is converted to an insoluble, infusible state by the addition of chloroacetamide.

EXAMPLE XXIII

| | Parts |
|---|---|
| $(NH_2)_2(C_3N_3)-\overset{O}{\underset{\|}{P}}(OCH_3)_2$ | 100.0 |
| Glucose | 150.0 | are caused to react as in Example XXII and is cured in the same manner.

EXAMPLE XXIV

In a reaction flask equipped with stirrer and reflux condenser are mixed

| | Parts |
|---|---|
| Melamine | 42.0 |
| $(NH_2)_2(C_3N_3)-\overset{O}{\underset{\|}{P}}(OH)_2$ | 191.0 |
| $(NH_2)_2-(C_3N_3)-\overset{O}{\underset{\|}{P}}(OH)_2$ | 256.0 |
| Formaldehyde solution (37.1%) | 320.0 | and the mixture heated to 90° C. until it gels (about one hour) and thereafter is cast in a shallow container and heated in an oven until the product is dry and hard. The product is then ground, washed with distilled water, and redried. This acidic ion exchange resin absorbs about 87% of the calculated amount of NaOH from a 5% NaOH solution, and will exchange the sodium ion for calcium, magnesium, iron, copper, etc. ions. Instead of melamine, other aldehyde reactable substances can be used in this formulation, including those that have an ion exchange group, e.g. urea, thioimmeline, phenol, phenosulfonic acid, etc. Also unmodified ion exchange resins can be made by using the aldehyde with only the triazine derivatives of this invention, singly or admixed with each other.

EXAMPLE XXV

In a suitable reaction flask 256 parts of $NH_2(C_3N_3)[\overset{O}{\underset{\|}{P}}(OH)_2]_2$, and
80 parts of 37% $CH_2O$ solution are warmed to 70–80° C. for 15 minutes, and then 80 parts of NaOH in
150 parts of $H_2O$ are added and the mixture refluxed for 1 hour. Upon testing as a tanning agent, a very light-colored leather of good body is obtained. Instead of the above triazine derivative,

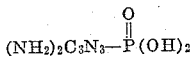

can be used with 160 parts of 37% $CH_2O$ to produce a tanning agent which produces a firm, compact and weighty leather of excellent character. These new tanning agents, can also be used, with advantage, in admixture with other tanning or non-tanning substances usually employed in tanning processes, such as vegetable tanning agents, fillers or buffer substances. Modified tanning agents and mordants can be prepared by intercondensing the triazine derivatives of this invention with other aldehyde reactable monomers such as urea, phenol, phenolsulfonic acid, resorcinol, etc.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A composition of matter comprising the reaction product of a mass comprising an aldehyde and a triazine derivative having the formula,

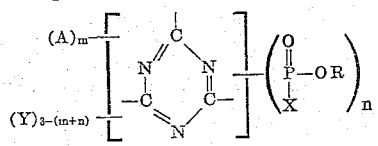

wherein $n$ and $m$ are integers having a value of at least one and no more than two, the sum of $m$ and $n$ does not exceed three, R is a member of the class consisting of hydrogen, monovalent hydrocarbon radicals and the fluoro, chloro, nitro, nitroso, amino, carboxy, carbalkoxy, alkoxy, aryloxy, and mercapto derivatives of monovalent hydrocarbon radicals, X is a member of the class consisting of —OR and —$NR_2$ groups, A is an aldehyde-reactable group, and Y is a monovalent radical.

2. A composition of claim 1, in which the triazine derivative has the formula $$NH_2—C_3N_3[—PO(OCH_3)_2]_2$$

3. A composition of claim 1, in which the triazine derivative has the formula $$(CH_3NH)_2C_3N_3—PO(OC_2H_5)_2$$

4. A composition of claim 1, in which the triazine derivative has the formula

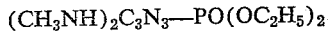

5. A composition of claim 1, in which the triazine derivative has the formula

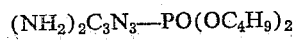

6. A composition of claim 1, in which the triazine derivative has the formula

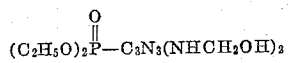

7. A composition of claim 1, in which said mass also comprises melamine.

8. A composition of claim 1, in which said mass also comprises dimethylol urea.

9. A composition of claim 1, in which said mass also comprises a glyceryl phthalate resin.

10. A composition of claim 1, in which said aldehyde comprises formaldehyde.

11. A condensation product of an aldehyde and $$(NH_2)_2(C_3N_3)—PO(OC_2H_5)_2$$

12. A condensation product of claim 11, in which said aldehyde is formaldehyde.

13. A condensation product of an aldehyde and $$NH_2—(C_3N_3)[PO(OC_2H_5)_2]_2$$

14. A condensation product of claim 13, in which said aldehyde is formaldehyde.

15. A process for preparing resinous compositions comprising the step of reacting an aldehyde with a triazine derivative having the formula,

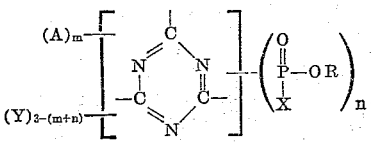

wherein $n$ and $m$ are integers having a value of at least one and no more than two, the sum of $m$ and $n$ does not exceed three, R is a member of the class consisting of hydrogen, monovalent hydrocarbon radicals and the fluoro, nitro, nitroso, amino, carboxy, carbalkoxy, alkoxy, aryloxy, and mercapto derivatives of monovalent hydrocarbon radicals, X is a member of the class consisting of —OR and —$NR_2$ groups, A is an aldehyde-reactable group, and Y is a monovalent radical, said aldehyde being reacted in amount of 1–8 moles per mole of triazine derivative, said reaction being conducted at a temperature of at least room temperature and being catalyzed by an agent selected from the class consisting of alkaline and acidic aldehyde-condensation catalysts.

16. A process of claim 15, in which said aldehyde is formaldehyde.

17. A process of claim 16, in which said reaction is performed in a mixture also containing an aldehyde-reactable amine compound in addition to triazine derivative.

18. A process of claim 17, in which said other aldehyde-reactable compound is melamine.

19. A process of claim 17, in which said other aldehyde-reactable compound is dimethylol urea.

References Cited in the file of this patent

UNITED STATES PATENTS 2,643,990    Ham               June 30, 1953